US012609751B2

(12) United States Patent
Huang et al.

(10) Patent No.: US 12,609,751 B2
(45) Date of Patent: Apr. 21, 2026

(54) METHOD OF REPORTING BEAM FAILURE, BASE STATION AND TERMINAL

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 382 days.

(21) Appl. No.: 17/423,580

(22) PCT Filed: Jan. 7, 2020

(86) PCT No.: PCT/CN2020/070642
§ 371 (c)(1),
(2) Date: Jul. 16, 2021

(87) PCT Pub. No.: WO2020/147616
PCT Pub. Date: Jul. 23, 2020

(65) Prior Publication Data
US 2022/0103226 A1     Mar. 31, 2022

(30) Foreign Application Priority Data
Jan. 16, 2019   (CN) ......................... 201910041784.5

(51) Int. Cl.
*H04B 7/06* (2006.01)
*H04L 5/00* (2006.01)
(Continued)

(52) U.S. Cl.
CPC ....... *H04B 7/06964* (2023.05); *H04L 5/0051* (2013.01); *H04W 72/23* (2023.01);
(Continued)

(58) Field of Classification Search
CPC .............. H04B 7/0695; H04B 7/06952; H04B 7/06964; H04B 7/088; H04B 7/0408;
(Continued)

(56) References Cited

U.S. PATENT DOCUMENTS

2019/0306765 A1* 10/2019 Cirik .................... H04B 7/0695
2020/0099437 A1* 3/2020 Harada ................. H04W 72/23
(Continued)

FOREIGN PATENT DOCUMENTS

CN         108513737 A    9/2018
CN         109314875 A    2/2019
(Continued)

OTHER PUBLICATIONS

International Search Report and Written Opinion issued Mar. 27, 2020 in International Application No. PCT/CN2020/070642.
(Continued)

*Primary Examiner* — Peter Chen
(74) *Attorney, Agent, or Firm* — Harness, Dickey & Pierce, P.L.C.

(57) ABSTRACT

A method of reporting beam failure, a base station, and a terminal are provided. The method includes: in a case that a beam failure of a Secondary Cell (Scell) is detected, sending, through a target cell, a beam failure recovery message of the Scell to a base station.

19 Claims, 3 Drawing Sheets in a case that a beam failure of a Scell is detected, sending, through a target cell, a beam failure recovery message of the Scell to a base station     ⟍ S210 obtaining a beam failure recovery message of a Scell which is sent by a terminal to the base station through a target cell     ⟍ S310

(51) Int. Cl.

| | | |
|---|---|---|
| *H04W 72/23* | (2023.01) | |
| *H04W 72/542* | (2023.01) | |
| *H04W 74/0833* | (2024.01) | |
| *H04W 76/19* | (2018.01) | |

(52) U.S. Cl.
CPC ..... *H04W 72/542* (2023.01); *H04W 74/0841* (2013.01); *H04W 76/19* (2018.02)

(58) Field of Classification Search
CPC ... H04W 76/19; H04W 72/23; H04W 72/231; H04W 72/232; H04W 72/21; H04W 72/542; H04W 74/0841; H04W 16/28; H04W 24/10; H04W 88/02; H04L 5/001; H04L 5/0048; H04L 5/005; H04L 5/0051
See application file for complete search history.

(56) References Cited

U.S. PATENT DOCUMENTS

| | | | |
|---|---|---|---|
| 2020/0344833 | A1 | 10/2020 | Gu et al. |
| 2020/0374960 | A1* | 11/2020 | Deenoo ................ H04B 7/0695 |
| 2021/0044344 | A1 | 2/2021 | Jiang |
| 2021/0314050 | A1* | 10/2021 | Li .......................... H04L 1/0026 |
| 2022/0061087 | A1* | 2/2022 | Koskela ................ H04W 16/28 |

FOREIGN PATENT DOCUMENTS

| | | |
|---|---|---|
| CN | 110022613 A | 7/2019 |
| WO | WO-2018/0237400 A1 | 12/2018 |

OTHER PUBLICATIONS

Nokia, Nokia Shanghai Bell, "Scell Beam Failure Recovery," 3GPP TSG-RAN WG2 Meeting #101bis, R2-1805342 Sanya, China, Apr. 16, 2018.

CATT, "Summary of email discussion on beam failure recovery on Scell," 3GPP TSG RAN WG1 Meeting #92, R1-1803397, Athens, Greece, Feb. 26, 2018.

Intel Corp., "Summary on Scell BFR and Beam Measurement," 3GPP TSG RAN WG1 Meeting #94b, R1-1811853, Chengdu, China, Oct. 8, 2018.

Extended European Search Report issued Feb. 17, 2022 in European Application No. 20741727.0.

Intel Co., "On SCell Beam Failure Recovery," 3GPP TSG RAN WG1 Meeting #94, R1-1808720, Aug. 11, 2018, Retrieved from the Internet: URL:http://www.3gpp.org/ftp/tsg%5Fran/WG1%5FRL1/TSGR1%5F94/Docs/R1%2D1808720%2Ezip.

Communication pursuant to Article 94(3) EPC issued Feb. 26, 2024 in European Application No. 20 741 727.0.

LG Electronics Inc., "Discussion on beam failure recovery for Scell," 3GPP Draft; R2-1913137, Oct. 4, 2019.

InterDigital Inc., "BFR on Scell," 3GPP Draft, R2-1806821, May 11, 2018.

Intel Corporation, "On Beam Management Enhancement," 3GPP Draft, R1-1900503, Jan. 12, 2019.

Huawei et al., " Beam failure recovery for Scell," 3GPP Draft, R1-1900846, Jan. 12, 2019.

* cited by examiner in a case that a beam failure of a Scell is detected, sending, through a target cell, a beam failure recovery message of the Scell to a base station    S210 obtaining a beam failure recovery message of a Scell which is sent by a terminal to the base station through a target cell

S310

METHOD OF REPORTING BEAM FAILURE, BASE STATION AND TERMINAL

CROSS-REFERENCE TO RELATED APPLICATIONS

The present application the U.S. national phase of PCT Application PCT/CN2020/070642 filed on Jan. 7, 2020, which claims a priority of Chinese patent application No. 201910041784.5 filed on Jan. 16, 2019, which is incorporated herein by reference in its entirety.

TECHNICAL FIELD

The present disclosure relates to the field of wireless technology, and in particular to a method of reporting beam failure, a base station, and a terminal.

BACKGROUND

In the NR system, in order to avoid resource waste and time delay, a fast and reliable beam failure detection and recovery process is standardized, so that the network side can quickly recover the transmission process from the beam failure.

The beam failure recovery (BFR) mechanism of the NR system in the related technology can only be performed in the primary cell (Primary Cell, Pcell). When a user equipment (User Equipment, UE) is also called a terminal and performs carrier aggregation (CA), a secondary cell (Secondary Cell, Scell) is often configured in a high frequency band. Therefore, BFR is also required on the SCell.

For the beam failure recovery mechanism of SCell, the following scenarios need to be considered:

Scenario 1: PCell is in FR1 (frequency band without BFR), and uplink (UPLINK, UL) and downlink (DOWNLINK, DL) transmission (SCell with UL/DL) can be performed on SCell;

Scenario 2: The PCell is in FR2 (the frequency band where BFR is required), and the uplink UL and downlink DL transmission (SCell with UL/DL) can be performed on the SCell;

Scenario 3: PCell is in FR1 (frequency band without BFR), and SCell can only perform downlink DL transmission (DL-only SCell);

Scenario 4: The PCell is in FR2 (the frequency band where BFR is required), and the SCell can only perform downlink DL transmission (DL-only SCell).

It is needed to design a beam failure detection and BFR mechanism on the SCell to ensure that the beam failure recovery of the SCell can be performed in various scenarios.

SUMMARY

The present disclosure is to provide a method of reporting beam failure, a base station, and a terminal, so as to enable the terminal to report beam failure events of the Scell.

A method of reporting beam failure is provided in an embodiment of the present disclosure, applied to a terminal and including:

in a case that a beam failure of a Secondary Cell (Scell) is detected, sending, through a target cell, a beam failure recovery message of the Scell to a base station.

A method of reporting beam failure is provided in an embodiment of the present disclosure, applied to a base station and including:

obtaining a beam failure recovery message of a Secondary Cell (Scell) which is sent by a terminal to the base station through a target cell.

A terminal is provided in an embodiment of the present disclosure, including: a transceiver, a memory, a processor and a program stored in the memory and executable on the processor, where the processor is configured to:

in a case that a beam failure of a Secondary Cell (Scell) is detected, send, through a target cell, a beam failure recovery message of the Scell to a base station.

A base station is provided in an embodiment of the present disclosure, including: a transceiver, a memory, a processor and a program stored in the memory and executable on the processor, where the processor is configured to:

obtain a beam failure recovery message of a Secondary Cell (Scell) which is sent by a terminal to the base station through a target cell.

A terminal is provided in an embodiment of the present disclosure, including:

a first transceiver module, configured to, in a case that a beam failure of a Secondary Cell (Scell) is detected, send, through a target cell, a beam failure recovery message of the Scell to a base station.

A base station is provided in an embodiment of the present disclosure, including:

a second transceiver module, configured to obtain a beam failure recovery message of a Secondary Cell (Scell) which is sent by a terminal to the base station through a target cell A computer-readable storage medium storing a computer program is provided in an embodiment of the present disclosure, where the computer program is executed by a processor to perform the method of reporting beam failure hereinabove.

At least one of the above-mentioned technical solutions of the embodiments of the present disclosure has the following beneficial effects:

when the beam failure of the Scell is detected, the beam failure recovery message of the Scell is sent to the base station through the target cell corresponding to the Scell where the beam failure is detected. Therefore, regardless of whether the current Scell can perform an uplink UL transmission, the beam failure detection and recovery on the SCell may be realized, thereby it is able to report the beam failure events of any Scell.

DETAILED DESCRIPTION

In order to make the technical problems, technical solutions, and advantages to be solved by the present disclosure clearer, a detailed description will be given below in conjunction with the drawings and specific embodiments.

Figures 1, 2:
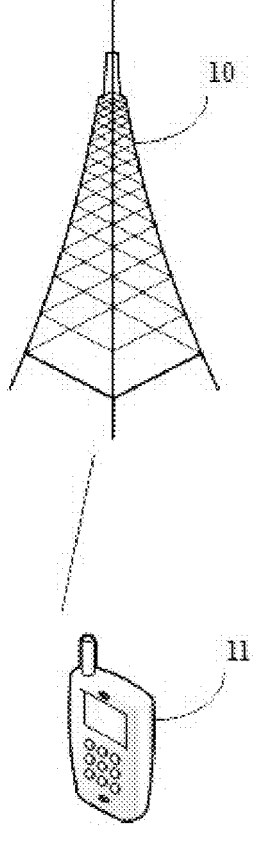
FIG. 1 is a schematic structural diagram of a wireless communication system of a method of reporting beam failure according to an embodiment of the disclosure.
FIG. 2 is a schematic flowchart of a first embodiment of a method of reporting beam failure according to an embodiment of the disclosure.

The method of reporting beam failure described in the embodiments of the present disclosure is applied to a wireless communication system, and the wireless communication system may adopt a 5G system, or an evolved Long Term Evolution (eLTE) system, or a subsequent evolved communication system. Referring to FIG. 1, which is a schematic diagram of the architecture of a wireless communication system provided by an embodiment of the present disclosure. As shown in FIG. 1, the wireless communication system may include: a base station 10 and user equipment, for example, the user equipment is denoted as UE 11, and the UE 11 may be connected to the base station 10. In practical applications, the connection between the above-mentioned various devices may be a wireless connection. In order to conveniently and intuitively indicate the connection relationship between the various devices, a solid line is used in FIG. 1 to indicate.

It should be noted that the aforementioned communication system may include multiple UEs, and the base station may communicate (transmit signaling or transmit data) with multiple UEs.

The base station 10 provided in the embodiments of the present disclosure may be a commonly used base station, an evolved node base station (eNB), or a network side device in a 5G system (such as a next generation node base station), GNB) or transmission and reception point (TRP)) or cell and other equipment.

The user equipment provided by the embodiments of the present disclosure may be a mobile phone, a tablet computer, a notebook computer, an Ultra-Mobile Personal Computer (UMPC), a netbook, or a Personal Digital Assistant (PDA), etc.

In wireless communication systems, for systems that use high frequency band transmission, the Downlink Control Channel (Physical Downlink Control Channel, PDCCH) can use analog beamforming transmission to achieve higher shaping gain and greater coverage. The radio resources used for the PDCCH are semi-statically divided into multiple control resource sets (Control Resource SET, CORESET), and each CORESET includes multiple PDCCH radio resources. The base station can semi-statically match one transmit beam direction for each CORESET, and different CORESETs match beams in different directions. The base station can perform dynamic switching in different CORESETs, thereby realizing dynamic switching of beams. When transmitting the PDCCH, the base station can select the CORESET of the appropriate beam direction according to the information of the terminal. At the receiving end, the terminal performs blind detection in multiple CORESETs configured. For each candidate CORESET, the terminal will use the receive beam corresponding to the CORESET transmit beam for reception.

Since the base station can transmit PDCCH through multiple downlink control channel beams, downlink beam failure is defined as: the quality of each downlink control channel beam received by the terminal is lower than the specified threshold, so that the terminal cannot effectively receive the PDCCH channel transmission Control information.

Without loss of generality, suppose that the base station has M beams for downlink control channel transmission, and a dedicated reference signal is configured for each beam. The terminal determines whether the downlink control channel meets the reception quality requirements by measuring the reference signals of the M beams. If the channel quality of all M beams is lower than the established threshold, the terminal will consider that a beam failure event has occurred.

The monitoring index parameter for beam failure in the NR system is the block error rate (BLER). The specific process is as follows: the terminal measures the performance of the reference signal of the same beam as the downlink control channel, and based on the measured signal-to-interference-to-noise ratio of the reference signal, the decoding error probability BLER of the PDCCH channel is inferred. If the BLER value is higher than the set threshold (for example, BLER=10%), it is considered that the beam has failed. When the terminal measures that the BLER values of all M beams are higher than the threshold, it is considered that a beam failure event has occurred. In the process of measuring the BLER, there is no need to demodulate and decode the PDCCH channel, just measure the performance of the corresponding reference signal, and estimate the BLER of the PDCCH channel based on the result of the reference signal. The configuration of the reference signal used for beam failure measurement (detection) may adopt an explicit configuration method in which the network informs the terminal through signaling, or the terminal may implicitly configure it through a beam configuration method through control signaling.

For the explicit configuration method, the base station configures the terminal with a reference signal set for measuring beam quality through signaling, including the reference signal type (Synchronization Signal Block (SSB) or channel state information reference signal CSI-RS), The transmission power, the resource indication of the reference signal, the reference signal resource, etc. all need to be clearly configured to the terminal through the network.

For the implicit indication method, the reference signal set configured to measure the beam quality can be derived from the transmission configuration indication (Transmission Configuration Indication, TCI) state of the corresponding CORESET resource. Specifically, for CORESET involving analog beamforming transmission, its TCI state will include the configuration information of a reference signal, and the quasi co-location QCL (Quasi co-location) type corresponding to the reference signal is QCL-Type D. If the network does not explicitly configure the reference signal for beam failure detection for the terminal, the terminal can measure the reference signal in the TCI state configured by CORESET to determine whether a beam failure occurs.

After the terminal measures the transmission of the beam failure event, the terminal needs to report the event to the base station and report the new candidate beam information. After receiving the reporting information, the base station recovers from the beam failure as soon as possible through the beam recovery process, and reselects a new beam for transmission to replace the original beam. The new beam will be used for the base station's response information transmission to the reported failure event, as well as the subsequent transmission of data and control information between the base station and the terminal.

In order to enable the terminal to report a new candidate beam, the network side needs to configure a corresponding reference signal resource set for the terminal, and these reference signals correspond to the candidate beam set. The terminal determines the pair of transceiver beams used for the transmission link by measuring the reference signal set. After the terminal completes the measurement, it reports the new candidate beam to the network side. The selected new candidate beam needs to meet the performance threshold requirements: Reference Signal Receiving Power (RSRP) exceeds the threshold.

Therefore, if all the downlink beams configured for the downlink control channel fail to be received, it is considered that the radio link has failed, and the process of radio link reconstruction is started. However, in the NR system in the related art, when the terminal performs carrier aggregation, the beam failure recovery BFR mechanism can only be performed in the primary cell Pcell, and there is no guarantee that the beam failure recovery of the Scell can be performed in various scenarios.

In order to solve the above problems, the embodiments of the present disclosure provide a method of reporting beam failure. When a beam failure of the Secondary Cell (Scell) is detected, a beam failure recovery message of the Scell is sent to the base station through the target cell, so that the terminal may report the beam failure to further perform the beam failure recovery of the Scell, thereby improving the system performance.

Specifically, as shown in FIG. 2, a method of reporting beam failure according to the embodiment of the present disclosure, applied to a terminal and including:

S210: in a case that a beam failure of a Secondary Cell (Scell) is detected, sending, through a target cell, a beam failure recovery message of the Scell to a base station.

In addition, in the embodiment of the present disclosure, optionally, the above-mentioned target cell is different from the Secondary Cell (Scell) in which the beam failure is detected.

Of course, optionally, the target cell and the Secondary Cell (Scell) where the beam failure is detected may be the same cell.

According to the method of reporting beam failure in the embodiment of the present disclosure, when a beam failure of the Secondary Cell (Scell) is detected, the beam failure recovery message of the Scell is sent to the base station through a target cell different from the cell where the beam failure is detected, as long as the target cell can perform UL Transmission, regardless of whether the current Scell can perform UL transmission, the beam failure detection and recovery on the SCell can be realized, thereby it is able to report the beam failure events of any Scell.

Optionally, the sending through the target cell the beam failure recovery message of the Scell to the base station includes at least one of:

Method 1: sending the beam failure recovery message of the Scell to the base station, through a target Physical Random Access Channel (PRACH) of the target cell;

Method 2: sending the beam failure recovery message of the Scell to the base station, through a Physical Uplink Control Channel (PUCCH) of the target cell;

Method 3: sending the beam failure recovery message of the Scell to the base station, through a configured grant based Physical Uplink Shared Channel (PUSCH) on the target cell; and Method 4: sending the beam failure recovery message of the Scell to the base station, through an uplink Sounding Reference Signal (SRS) on the target cell.

Optionally, the beam failure recovery message includes a beam failure report message and/or a candidate beam for beam failure recovery.

It is understandable that the beam failure recovery message may also include the target reference signal of at least part of the candidate beams configured to represent the beam failure recovery of the Scell. Of course, the beam failure recovery message may also include the beam quality message detected by the terminal. Hereinafter, the specific process of the method of reporting beam failure described in the embodiment of the present disclosure will be described in detail by taking the beam failure recovery message including the candidate beam or the target reference signal as an example. According to this specific process, those skilled in the art should be able to understand the specific execution process when the beam failure recovery message includes other information, which will not be described in detail here.

The following is a detailed description of each method that can realize the target cell sending the beam failure recovery message of the Scell to the base station.

For Method 1

Specifically, in a case that the beam failure recovery message of the Scell is sent to the base station through the target PRACH of the target cell, there exists a corresponding relationship between a target PRACH and a target reference signal, the target reference signal is configured to represent at least part of reporting information included in the beam failure recovery message of the Scell.

It should be noted that the report information included in the beam failure recovery message may include the reported candidate beam, reference signal, and/or beam quality information, etc. The target reference signal is configured to represent the report information included in the beam failure message, and the correspondence between the target PRACH and the target reference signal is established. When receiving the beam failure recovery message sent by the terminal through the PRACH of the target cell, the base station can determine the beam information reported by the terminal for beam failure recovery.

For example, when the reported candidate beam is included in the beam failure recovery message, the base station configures one or more candidate beams for beam failure recovery for the Scell, and the candidate beams can be indicated by a reference signal to represent the corresponding candidate beam. To facilitate understanding, the reference signal corresponding to the candidate beam used for beam failure recovery may be expressed as BFR-RS. In the embodiments of the present disclosure, by making the BFR-RS and the uplink PRACH have a corresponding relationship, and the BFR-RS can represent candidate beams, when the beam failure recovery message of the Scell is sent through the target PRACH, the corresponding target BFR-RS may be determined according to the target PRACH and the corresponding relationship between PRACH and BFR-RS, and further according to the target BFR-RS, the represented candidate beam can be determined, so as to determine the candidate beam reported by the terminal for beam failure recovery.

According to the foregoing manner, the method of reporting beam failure according to the embodiment of the present disclosure is adopted, and the method further includes:

obtaining at least one reference signal and an association relationship between each of the at least one reference signal and a corresponding PRACH which are configured by the base station;

the at least one reference signal is configured to represent a candidate beam for a beam failure recovery of the Scell, the target reference signal is one of the at least one reference signal, and the target PRACH is one of the PRACHs.

In the embodiments of the present disclosure, optionally, there is a correspondence between different BFR-RSs and different uplink PRACHs. Optionally, this correspondence is that multiple BFR-RSs correspond to the same uplink PRACH, and the base station can determine the multiple BFR-RSs according to a received PRACH. Optionally, the corresponding relationship is that a one-to-one relationship between BFR-RS and the PRACH, so that the base station can uniquely determine the BFR-RS based on the received PRACH. The one-to-one correspondence here can be various forms of one-to-one correspondence. For example, it can be a one-to-one correspondence between PRACH resources and BFR-RS, or it can be a one-to-one correspondence between PRACH preamble sequence and BFR-RS (in this way, multiple BFR-RS may correspond to the same PRACH resource, that is, the same PRACH resource can be configured to carry multiple BFR-RS information, and different BFR-RS correspond to different PRACH preamble sequences. The preamble sequence of the PRACH can distinguish different BFR-RS), or the one-to-one correspondence between the transmission time of the PRACH and the BFR-RS, etc.

In the embodiment of the present disclosure, the base station may use the candidate beam reported by the terminal to send a beam failure recovery response to the terminal.

In the embodiment of the present disclosure, the PRACH channel may be a contention PRACH channel or a non-contention PRACH channel.

In addition, the BFR-RS may be a downlink signal such as a synchronization signal block (Synchronization Signal Block, SSB) and/or a channel state information reference signal (Channel State Information reference signals, CSI-RS).

Further, when there are at least two reference signals configured by the base station, the sending the beam failure recovery message of the Scell to the base station through the target Physical Random Access Channel (PRACH) of the target cell includes:

selecting at least one reference signal as the target reference signal;

determining the target PRACH corresponding to each target reference signal according to the association relationship between each of the reference signals and the corresponding PRACH;

sending each of the target PRACHs to the base station.

Optionally, the association relationship between each reference signal and the corresponding PRACH is that multiple reference signals correspond to the same PRACH, and the base station can determine the multiple reference signals according to one PRACH received. This association relationship may be the corresponding relationship between the PRACH resource and the reference signal, the corresponding relationship between the PRACH preamble sequence and the reference signal, or the corresponding relationship between the transmission time of the PRACH and the reference signal, and so on.

For example, the association relationship between each reference signal and the corresponding PRACH may be: a one-to-one correspondence between PRACH resources and BFR-RS, or a one-to-one correspondence between PRACH preamble sequence and BFR-RS, or a one-to-one correspondence between the transmission time of PRACH and the BFR-RS. In the above manner, if one Scell corresponds to multiple BFR-RSs, when beam failure occurs in the SCell, the UE can select one or more BFR-RSs from them, and send the corresponding PRACHs respectively. When the base station detects a PRACH corresponding to one BFR-RS of a Scell, the base station can learn that the Scell has a beam failure, and at the same time learn that the candidate beam represented by the BFR-RS corresponding to the PRACH is the beam reported by the UE.

In addition, in another embodiment of sending the beam failure recovery message of the Scell to the base station through the target physical random access channel (PRACH) of the target cell, the beam failure recovery message of the Scell is sent to the base station based on the preamble sequence or transmission time-frequency position of the target PRACH.

In this way, a PRACH can be associated with multiple BFR-RS, that is, multiple BFR-RS (also called this group) can be sent through a target PRACH, when the base station detects the target PRACH, the group of BFR-RS can be determined based on the preamble sequence or the transmission time-frequency position of the target PRACH. Optionally, the preamble sequence or the transmission time-frequency position of the target PRACH may correspond to different BFR-RSs respectively. According to the different preamble sequence or the transmission time-frequency position of the target PRACH, the indicated target BFR-RS in this group of BFR-RS can be determined, so as to determine the candidate beam reported through the target cell by the Scell that has beam failure.

In the above manner, the association relationship between PRACH and BFR-RS can be indicated by the association relationship between BFR-RS and PRACH channel preamble sequence and/or transmission time-frequency position. For example, the base station can send the association relationship between PRACH and BFR-RS to the UE through a radio resource control RRC signaling, e.g., the PRACH-Resource Dedicated BFR is configured with the BFR-RS of Scell with an index of SCellIndex, when the BFR-RS is an SSB, the association relationship between SSB and PRACH preamble sequence and/or transmission time-frequency position is indicated in the BFR-SSB-Resource; when BFR-RS is CSI-RS, BFR-CSI RS-Resource indicates the association relationship between the CSI-RS and the preamble sequence and/or transmission time-frequency of PRACH.

For Method 2

When sending the beam failure recovery message of the Scell to the base station through the Physical Uplink Control Channel (PUCCH) of the target cell:

the beam failure recovery message of the Scell is sent to the base station, through PUCCH resource on the target cell configured by the base station for the terminal to send the beam failure recovery message of the Scell.

Specifically, the PUCCH resource configured by the base station for the terminal to send the beam failure recovery message of the Scell may be a periodic resource. In this way, the method of sending the beam failure recovery message of the Scell to the base station through the Physical Uplink Control Channel (PUCCH) of the target cell can be similar to the sending method of sending the scheduling request SR, that is, being sent on the periodic resources configured by the base station for the UE.

Optionally, through the method of reporting beam failure in the above manner, when the beam failure recovery message of the Scell is sent to the base station through the Physical Uplink Control Channel (PUCCH) of the target cell, the beam failure recovery message includes candidate beam indication information configured to indicate the candidate beam for beam failure recovery of the Scell. Through the candidate beam indication information, a candidate beam whose channel quality meets certain requirements is indicated.

Optionally, when the beam failure recovery message of the Scell is sent to the base station through the Physical Uplink Control Channel (PUCCH) of the target cell, the beam failure recovery message includes Scell beam quality information detected by the terminal.

Of course, the beam failure recovery message may also include the target reference signal of at least part of the candidate beams configured to represent the beam failure recovery of the Scell, etc., and each possible content will not be illustrated separately here.

Optionally, the candidate beam indication information indicates the candidate beam by indicating a reference signal corresponding to the candidate beam on the Scell.

That is, specifically, the candidate beam indication information may be indicated by the reference signal corresponding to the candidate beam. Optionally, the reference signal corresponding to the candidate beam is the reference signal on the Scell.

In addition, it should be noted that when a beam failure recovery message configured to indicate beam failures of multiple Scells is sent to the base station through the target cell, the candidate beam indication information corresponding to respective Scells may be indicated respectively through the reference signals corresponding to the candidate beams of respective Scells.

It can be understood that the base station configures a corresponding reference signal for each candidate beam of the terminal, and the candidate beam has a corresponding relationship with the configured reference signal. Optionally, the corresponding relationship is a one-to-one corresponding relationship. The "reference signal corresponding to the candidate beam" mentioned in the embodiment of the present disclosure refers to the reference signal configured by the base station for the terminal and has a one-to-one correspondence with the candidate beam.

For Method 3

When sending the beam failure recovery message of the Scell to the base station through the configured grant based Physical Uplink Shared Channel (PUSCH) on the target cell, the beam failure recovery message of the Scell is sent to the base station, through a Media Access Control Element (MAC CE) carried in the configured grant based PUSCH on the target cell; or the beam failure recovery message of the Scell is sent to the base station, through Semi-persistent Channel State Information (SP CSI) carried in the configured grant based PUSCH on the target cell.

For example, the beam recovery request indication field of Scell is added to the RRC configuration information of PUSCH scheduled by the configured grant, to send the beam failure recovery message of Scell.

For Method 3 the sending the beam failure recovery message of the Scell to the base station through the uplink SRS on the target cell includes at least one of:

a preset association relationship between the SRS on the target cell and a reference signal of a candidate beam configured to represent a beam failure recovery of the Scell; or scrambling the SRS by using a target scrambling sequence on the target cell, where there exists a preset corresponding relationship between the target scrambling sequence and the Scell; or modulating the SRS by a target modulation method on the target cell, where there exists a preset corresponding relationship between the target modulation method and the Scell.

Specifically, when obtaining the beam failure recovery message of the Secondary Cell (Scell) sent by the terminal to the base station through the target cell through the reference signal carried in the SRS on the target cell, the association information between SRS and BFR-RS may be configured through the base station, and different SRS can correspond to different BFR-RS. In this way, when the base station receives an SRS and the SRS has an associated BFR-RS, the base station can determine that a beam failure occurs on the SCell corresponding to the BFR-RS, and can determine that the candidate beam of the Scell reported by the UE is the beam corresponding to this BFR-RS. Optionally, the association information between the SRS and the BFR-RS is that one SRS corresponds to a group of BFR-RS, and the base station can determine a group of BFR-RS according to the SRS. Optionally, the relationship between each BFR-RS and SRS is a one-to-one corresponding relationship, and the base station can uniquely determine the BFR-RS according to the SRS.

When obtaining the beam failure recovery message of the Secondary Cell (Scell) sent by the terminal to the base station by determining the target scrambling sequence used when the SRS sent on the target cell is scrambled, the base station can configure the corresponding relationship between the scrambling sequence and the Scell, that is, the scrambling sequence can be determined according to each Scell, and different Scells can correspond to different scrambling sequences. In this way, the terminal sends the beam failure recovery message of the Scell to the base station through the target cell, and the SRS can be scrambled according to the target scrambling sequence associated with the Scell. In this way, when the base station receives the SRS, the base station can determine the SCell where the beam failure occurs, according to the superior code. Optionally, the association information between the Scell and the scrambling sequence is that one scrambling sequence corresponds to a group of Scells, and the base station can determine that the beam failure occurs on a group of Scells according to the scrambling sequence. Optionally, each Scell corresponds to a unique and specific scrambling sequence, and the base station can uniquely determine the Scell according to the scrambling sequence.

When obtaining the beam failure recovery message of the Secondary Cell (Scell) sent by the terminal to the base station by determining the target modulation mode of the SRS sent on the target cell, the corresponding relationship between the modulation mode and Scell can be configured through the base station, and different Scells correspond to different modulation methods. In this manner, the terminal sends the beam failure recovery message of the Scell to the base station through the target cell, and the SRS can be modulated according to the target modulation mode corresponding to the Scell. In this way, when the base station receives an SRS, according to the modulation mode of the SRS, the Scell where the beam failure occurs can be determined. Optionally, the association information between the Scell and the modulation mode is that one modulation mode corresponds to a group of Scells, and the base station can determine that the beam failure occurs on a group of Scells according to the modulation mode. Optionally, each Scell corresponds to a unique and specific modulation mode, and the base station can uniquely determine the Scell according to the modulation mode.

Optionally, the beam failure recovery message includes candidate beam indication information. When the SRS is scrambled using the target scrambling sequence on the target cell, and the beam failure recovery message of the Scell is sent to the base station, the base station can also configure the corresponding relationship between the scrambling sequence and the candidate beams indicated in the beam failure recovery message, and the candidate beams indicated by different beam failure recovery messages may correspond to different scrambling sequences. In this manner, the terminal sends the beam failure recovery message of the Scell to the base station through the target cell, and can scramble the SRS according to the target scrambling sequence associated with the candidate beam indicated by the beam failure recovery message. In this way, when the base station receives the SRS, it can determine the candidate beam indicated by the beam failure recovery message according to the optimal code. In this manner, optionally, the base station and the terminal need to exchange the corresponding relationship between the SRS and the Scell, so that the base station and the terminal may have the same consensus about which SRS is used to carry the beam failure recovery message of which Scell. The correspondence between this SRS and the Scell may be indicated to the terminal by the base station through a signaling.

When the SRS is modulated by the target modulation method on the target cell, and the base station sends the beam failure recovery message of the Scell, the corresponding relationship between the modulation method and the Scell can also be configured by the base station, and the candidate beams indicated by different beam failure recovery messages correspond to different modulation modes. In this way, the terminal sends the Scell beam failure recovery message to the base station through the target cell, and can modulate the SRS according to the target modulation mode corresponding to the candidate beam indicated by the beam failure recovery message. In this way, when the base station receives an SRS, according to the modulation mode of the SRS, the candidate beam indicated by the beam failure recovery message can be determined. In this manner, optionally, the base station and the terminal need to exchange the corresponding relationship between the SRS and the Scell, so that the base station and the terminal may have the same consensus about which SRS is used to carry the beam failure recovery message of which Scell. The correspondence between this SRS and the Scell may be indicated to the terminal by the base station through a signaling.

In the embodiments of the present disclosure, the foregoing Methods 1 to 4 are only examples for implementing the transmission of the beam failure recovery message of the Scell to the base station through the target cell. The specific embodiment is not limited to this, and the possible way specific to each case will not be explained separately in the following.

Optionally, in the method of reporting beam failure according to the embodiment of the present disclosure, in Step S210:

in a case that it is detected that a beam failure occurs on at least two Scells, the sending, through the target cell, the beam failure recovery message of the Scell to the base station further includes: sending, to the base station, through the target cell, the beam failure recovery message configured to indicate the beam failure of each Scell; or sending, to the base station, through the target cell, the beam failure recovery message configured to indicate the beam failure of a part of Scells in at least two Scells, and the beam failure recovery message configured to indicate the beam failure of another part of Scells in at least two Scells.

Specifically, when the target cell sends a beam failure recovery message configured to indicate beam failure of each Secondary Cell (Scell) to the base station, one beam failure recovery message can be configured to indicate beam failure events on multiple Scells, i.e., a joint reporting of beam failure events on multiple Scells. For example, one beam failure recovery message reported by the UE corresponds to multiple SCells at the same time, and the corresponding relationship between the beam failure recovery message and the SCells may be specified in an agreement or indicated to the UE by the base station through a signaling.

When the target cell sends a beam failure recovery message configured to indicate beam failure in a part of the at least two Scell to the base station, and sends a beam failure recovery message configured to indicate another part of the at least two Scell, an independent reporting of beam failure events on some Scells and joint reporting of beam failure events on some Scells can be realized.

Optionally, one BFR-RS reported by the UE may be associated with multiple SCells at the same time, and the UE reporting this BFR-RS is equivalent to reporting beam failures of multiple SCells at the same time.

Optionally, in the method of reporting beam failure according to the embodiment of the present disclosure, in Step S210, in the step of sending the beam failure recovery message of the Scell to the base station through the target cell, the beam failure recovery message includes an L-bit indication information, each of the L bits is configured to indicate a beam failure reporting situation of the Scell, where L is an integer greater than or equal to 1.

Specifically, the L-bit indication information may use a bitmap to indicate the Scell that performs beam failure reporting. Optionally, the L-bit indication information can be configured to indicate that the corresponding Scell has a beam failure when the position corresponding to a bit is 1, and configured to indicate the corresponding Scell when the position corresponding to a bit is 0. No beam failure occurs; or, by indicating that the position corresponding to a bit is 0, it is configured to indicate that the corresponding Scell has a beam failure, and when the position corresponding to a bit is 1, it is configured to indicate that the corresponding Scell does not have a beam failure.

Optionally, in the embodiment of the present disclosure, the value of L is equal to the maximum number of Scells for beam failure reporting.

Optionally, L-bit indication information may be configured to indicate whether the Scell needs to perform a beam failure recovery.

Optionally, in the embodiments of the present disclosure, the L-bit indication information may also be configured to indicate candidate beams used for Scell beam failure. The corresponding relationship between the L-bit indication information and the candidate beam of the Scell may be indicated by the base station in advance by the base station through a signaling.

According to the method of reporting beam failure in the embodiment of the present disclosure, before Step S210 is performed, the method further includes:

determining the target cell corresponding to the Scell according to an agreement; or in a case that the beam failure recovery message includes a candidate beam, based on a preset association relationship between a candidate beam for a beam failure recovery of the Scell and at least one cell, determining a cell corresponding to a candidate beam included in the beam failure recovery message as the target cell; or determining the target cell according to a cell where the target reference signal is located, where the target reference signal is a reference signal that represents at least one candidate beam for a beam failure recovery of the Scell The following is a detailed description of each of the above-mentioned methods for determining the target cell.

Method 1

When determining the target cell corresponding to the Secondary Cell (Scell) according to the agreement, regardless of whether the Scell contains an uplink, for each Scell, the target cell is determined according to the agreement, where the target cell may be PCell or Scell.

Optionally, the content agreed in the agreement includes at least one of the following:

the target cell corresponding to each Secondary Cell (Scell) is the primary cell; the advantage of using this method is that no signaling configuration is required. Because there must be an uplink on the PCell, it can ensure that each Scell performs beam failure reporting. However, the disadvantage is that if all SCells are reported in the PCell, more reporting resources may be required. In addition, the PCell may also have a beam failure, and the base station may not be able to receive the reporting information of the PCell at this time;

the target cell corresponding to each Secondary Cell (Scell) is a cell that can perform PUCCH transmission of the Scell; the advantage of using this method is that no signaling configuration is required, because there must be an uplink on the cell that can perform PUCCH transmission of the Scell. Therefore, it can be ensured that each Scell performs beam failure reporting. However, the disadvantage is that multiple SCells report in a cell where PUCCH transmission of the Scell can be performed, which may require more report resources. In addition, the cell where the PUCCH transmission of the Scell can be performed may also have a beam failure, and the base station may not receive the reporting information at this time;

the target cell corresponding to each Secondary Cell (Scell) is a cell whose frequency point is within a predefined frequency domain range; according to FR1 in the NR system Rel-15 standard, the predefined frequency domain range can be a cell whose frequency point is lower than a preset value. For example, the preset value can be 6 GHz. Based on the agreement, it can be agreed that the target cell corresponding to each Secondary Cell (Scell) is a cell with a frequency lower than the preset value.

The target cell corresponding to each Secondary Cell (Scell) in a frequency band is the same cell, and the target cell is predefined; for example, the target cell corresponding to each S cell in a frequency band is predefined, and it can be agreed that when there is a PCell, the target cell is the PCell; when there is no PCell, the target cell is the SCell with the lowest frequency.

determined according to the indication of the base station;

Specifically, the base station may indicate to the terminal in advance the target cell corresponding to the Scell through signaling. The signaling may be RRC signaling, MAC CE signaling and/or DCI signaling.

For example, the BFR signaling sent by the base station to the UE includes the indication information of the target cell. For example, a field is added to PRACH-Resource Dedicated FR, which is configured to indicate the target cell configured to transmit the beam failure report of the SCell. For another example, the base station configures a PRACH-Resource DedicatedBFR for each cell of the UE. Two fields are added to the PRACH-ResourceDedicatedBFR, one field is configured to indicate the identity of the SCell, and one field is configured to indicate the target of sending the beam failure recovery message of the Scell. The identity of the cell. For another example, two fields are added to the RRC signaling BeamFailureRecoveryConfig sent by the base station to the UE. One field is configured to indicate the identity of the SCell (field 1), and one field is configured to indicate the identity of the target cell that sends the beam failure recovery message of the Scell (Field 2), the two fields have a one-to-one correspondence. That is, the nth target cell indicated by field 2 is the target cell corresponding to the nth Scell indicated by field 1, where n is greater than or equal to 1, and less than or equal to the number of Scells indicated by field 1.

Optionally, the base station indicates the determination rule of the target cell for the terminal through signaling, and the terminal determines the target cell according to the determination rule indicated by the base station.

It is understandable that the above method of determining the target cell for sending the beam failure recovery message of the Scell through the agreement is only an example for illustration, and the details are not limited thereto.

Method 2

When it is determined that the cell corresponding to the candidate beam reported in the beam failure recovery message is the target cell according to the preset association relationship between the candidate beam used for beam failure recovery of the Scell and at least one cell. It can be understood that when the BFR-RS can represent the candidate beam used for beam failure recovery of the Scell, that is, when the BFR-RS has a corresponding relationship with the candidate beam, the candidate beam has an association relationship with the target cell. Because the BFR-RS has an associated relationship with the target cell.

In this way, if one Scell corresponds to one BFR-RS, the UE can determine the target cell for beam failure reporting of the Scell according to the association relationship between the BFR-RS and the target cell; if one Scell corresponds to multiple BFR-RSs, that is, When multiple candidate beams are included, the UE can select a candidate beam for beam failure reporting from the multiple candidate beams, and determine the BFR-RS corresponding to the reported candidate beam, and further determines the target cell of reporting the failure of the Scell beam based on the association relationship between the BFR-RS and the TCell.

Optionally, an associated Cell (that is, the target cell used for Scell beam failure reporting) can be defined for a BFR-RS in the protocol. If the UE selects a BFR-RS as a candidate reference signal for beam failure recovery, the UE sends a beam failure recovery message on the Cell associated with it. Optionally, the association relationship between the BFR-RS and the target cell may be indicated to the UE by the base station through signaling, and the signaling may optionally be RRC signaling. Optionally, the association relationship between the BFR-RS and the target cell may also be indicated to the UE by the base station through MAC CE or DCI.

In the above manner, the determination of the target cell depends on the candidate beam selected by the UE for beam failure recovery. The target cell can be a different cell from the cell where the BFR-RS is located. For example, for SCell 1, the BFR-RS selected by the UE is the reference signal on Scell 2, but the TCell corresponding to the BFR-RS is SCell 3, then the UE sends a beam failure recovery message on SCell 1 on SCell 3.

The above method is relatively flexible, and the base station can select a better target base station for each BFR-RS according to the load, frequency, channel quality and other conditions of each carrier.

Method 3

According to the cell where the target reference signal is located, the target cell configured to send the beam failure recovery message of the Scell to the base station is determined, that is, the target cell is the cell where the BFR-RS corresponding to the candidate beam selected by the UE is located.

When one Scell corresponds to only one BFR-RS, the target cell is the cell where the BFR-RS is located; when one Scell corresponds to multiple BFR-RS, the target cell may be a cell where the BFR-RS corresponding to the candidate beam which is determined to be reported by the UE is located. That is, in the step of determining the target cell according to the cell where the target reference signal is located, the target reference signal is configured to represent the candidate beam reported by the beam failure recovery message.

In this way, the determination of the target cell depends on the candidate beam selected by the UE for beam failure recovery. In this way, the target cell should be a cell that includes both UL and DL configurations, that is, the target cell can perform uplink transmissions as well as downlink transmissions.

It is understandable that the above-mentioned several ways of determining the target cell for sending the beam failure recovery message of the Scell to the base station are merely examples, and the details are not limited thereto.

For example, in specific implementation, the above-mentioned method 1 to method 3 may also be configured to determine the target cell. For example, for some SCells, method 1 can be adopted, and for other parts of Scells, method 2 or 3 can be adopted. For some specific solutions, for example, for SCells whose target cells are pre-defined or agreed upon by agreement, the target cell is determined by a predefined or agreed upon agreement, and for SCells that do not have a predefined or agreed upon target cell, the method 2 or 3 for determining the target cell is adopted.

According to the method of reporting beam failure in the embodiment of the present disclosure, when the beam failure of the Secondary Cell (Scell) is detected, the target cell corresponding to the secondary cell where the beam failure is detected is sent to the base station through the beam failure recovery message of the Scell, regardless of the current Whether the Scell can perform UL transmission can realize the beam failure detection and recovery on the SCell, so as to meet the requirements of reporting the beam failure event of any Scell.

Figures 3, 4:
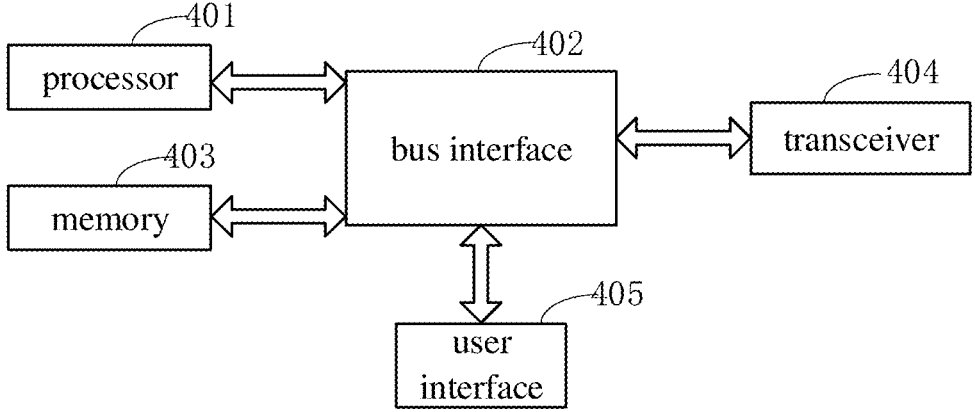
FIG. 3 is a schematic flowchart of a second embodiment of a method of reporting beam failure according to an embodiment of the disclosure.
FIG. 4 is a schematic structural diagram of a terminal according to the embodiment of the disclosure.

The embodiment of the present disclosure also provides a method of reporting beam failure of another embodiment, which is applied to a base station, as shown in FIG. 3, the method includes:

S310: obtaining a beam failure recovery message of a Secondary Cell (Scell) which is sent by a terminal to the base station through a target cell.

Optionally, the beam failure recovery message includes a beam failure report message and/or a candidate beam for beam failure recovery.

Optionally, the target cell is different from the Scell. Of course, optionally, the target cell and the Secondary Cell (Scell) where the beam failure is detected may be the same cell.

Optionally, the method of reporting beam failure described in the embodiment of the present disclosure adopts at least one of the following methods to obtain the beam failure recovery message of the Secondary Cell (Scell) sent by the terminal to the base station through the target cell:

Method 1: obtaining the beam failure recovery message of the Scell sent to the base station by the terminal, through a target Physical Random Access Channel (PRACH) of the target cell;

Method 2: obtaining the beam failure recovery message of the Scell sent to the base station by the terminal, through a Physical Uplink Control Channel (PUCCH) of the target cell;

Method 3: obtaining the beam failure recovery message of the Scell sent to the base station by the terminal, through a configured grant based Physical Uplink Shared Channel (PUSCH) on the target cell; and Method 4: obtaining the beam failure recovery message of the Scell sent to the base station by the terminal, through an uplink Sounding Reference Signal (SRS) on the target cell.

Optionally, in a case that the beam failure recovery message of the Scell sent to the base station by the terminal is obtained through the PRACH of the target cell, a candidate beam reported by the terminal is determined according to the PRACH, where there exists a corresponding relationship between a target PRACH and a target reference signal, the target reference signal is configured to represent at least part of reporting information included in the beam failure recovery message of the Scell.

It should be noted that the report information included in the beam failure recovery message may include the reported candidate beam, reference signal, and/or beam quality information, etc. The target reference signal is configured to represent the report information included in the beam failure message, and the target is established. The correspondence between the PRACH and the target reference signal. When receiving the beam failure recovery message sent by the terminal through the PRACH of the target cell, the base station can determine the beam information reported by the terminal for beam failure recovery.

For example, when the beam failure recovery message includes the reported candidate beam, the above-mentioned method 1 is adopted, by making the BFR-RS and the uplink PRACH have a corresponding relationship, and the BFR-RS can represent the candidate beam, so that when the target PRACH is passed When sending the beam failure recovery message of the Scell, according to the target PRACH, the corresponding target BFR-RS can be determined, and further according to the target BFR-RS, the represented candidate beam can be determined, thereby determining the candidate beam reported by the terminal for beam failure recovery.

Optionally, the method further includes:

sending, to the terminal, at least one reference signal and an association relationship between each of the at least one reference signal and a corresponding PRACH which are configured;

the at least one reference signal is configured to represent the candidate beam for a beam failure recovery of the Scell, the target reference signal is one of the at least one reference signal, and the target PRACH is one of the PRACHs.

In the embodiments of the present disclosure, optionally, there is a correspondence between different BFR-RSs and different uplink PRACHs. Optionally, this correspondence is that multiple BFR-RSs may correspond to the same uplink PRACH, and the base station may determine the multiple BFR-RSs according to a received PRACH. Optionally, there is a one-to-one correspondence between each BFR-RS and PRACH, so that the base station can uniquely determine the BFR-RS based on the received PRACH. The one-to-one correspondence here can be various forms of one-to-one correspondence, for example, it can be a one-to-one correspondence between PRACH resources and BFR-RS, or it can be a one-to-one correspondence between PRACH preamble sequence and BFR-RS, or the one-to-one correspondence between PRACH transmission time and BFR-RS, etc.

In the embodiment of the present disclosure, the base station may use the candidate beam reported by the terminal to send a beam failure recovery response to the terminal.

In addition, in another embodiment in which the beam failure recovery message of the Secondary Cell (Scell) sent by the terminal to the base station is obtained through the target Physical Random Access Channel (PRACH) of the target cell, the target Physical Random Access Channel (PRACH) may be used. The preamble sequence or the transmission time-frequency position is configured to obtain the beam failure recovery message.

In this way, a PRACH can be associated with multiple BFR-RS, that is, multiple BFR-RS (also called this group) can be sent through a target PRACH, when the base station detects the target PRACH, according to the target PRACH, the group of BFR-RS can be determined by the preamble sequence or the transmission time-frequency position of the PRACH. Optionally, the preamble sequence or the transmission time-frequency position of the target PRACH may correspond to different BFR-RSs respectively. According to the different preamble sequence or the transmission time-frequency position of the target PRACH, the target BFR-RS indicated in the group of BFR-RS can be determined, so as to determine the candidate beam reported through the target cell by the Scell where the beam failure occurs.

In the above manner, the association relationship between PRACH and BFR-RS can be indicated by the association relationship between BFR-RS and PRACH channel preamble sequence and/or transmission time-frequency position. For example, the base station can send the association relationship between PRACH and BFR-RS to the UE through a radio resource control RRC signaling, e.g., the PRACH-Resource Dedicated BFR is configured with the BFR-RS of Scell with an index of SCellIndex, when the BFR-RS is an SSB, the association relationship between SSB and PRACH preamble sequence and/or transmission time-frequency position is indicated in the BFR-SSB-Resource; when BFR-RS is CSI-RS, BFR-CSI RS-Resource indicates the association relationship between the CSI-RS and the preamble sequence and/or transmission time-frequency of PRACH Optionally, in a case that the beam failure recovery message of the Scell sent to the base station by the terminal is obtained through the PUCCH of the target cell, the beam failure recovery message of the Scell sent by the terminal is obtained through PUCCH resource on the target cell configured by the base station for the terminal to send the beam failure recovery message of the Scell Optionally, when obtaining the beam failure recovery message of the Secondary Cell (Scell) sent by the terminal to the base station through the Physical Uplink Control Channel (PUCCH) of the target cell, the beam failure recovery message includes a candidate beam indication information configured to indicate a candidate beam for a beam failure recovery of the Scell.

Optionally, when the beam failure recovery message of the Scell is sent to the base station through the Physical Uplink Control Channel (PUCCH) of the target cell, the beam failure recovery message includes the Scell beam quality information monitored by the terminal.

Of course, the beam failure recovery message may also include the target reference signal of at least part of the candidate beams configured to represent the beam failure recovery of the Scell, etc., and each possible content will not be illustrated here.

Optionally, the candidate beam indication information indicates the candidate beam by indicating a reference signal corresponding to the candidate beam on the Scell.

Optionally, in a case that the beam failure recovery message of the Scell sent to the base station by the terminal is obtained through the configured grant based PUSCH on the target cell, the beam failure recovery message of the Scell sent to the base station by the terminal is obtained through a Media Access Control Element (MAC CE) carried in the configured grant based PUSCH on the target cell; or the beam failure recovery message of the Scell sent to the base station by the terminal is obtained through Semi-persistent Channel State Information (SP CSI) carried in the configured grant based PUSCH on the target cell.

Optionally, the obtaining the beam failure recovery message of the Scell sent to the base station by the terminal through the uplink SRS on the target cell includes at least one of:

obtaining the beam failure recovery message of the Scell which is sent by the terminal to the base station through the target cell, through a reference signal carried in the SRS on the target cell, where the reference signal is configured to represent a candidate beam for a beam failure recovery of the S cell, and there exists a preset association relationship between the reference signal and the SRS; or obtaining the beam failure recovery message of the Scell which is sent by the terminal to the base station, by determining a target scrambling sequence for scrambling the SRS sent on the target cell, where there exists a preset corresponding relationship between the target scrambling sequence and the Scell; or obtaining the beam failure recovery message of the Scell which is sent by the terminal to the base station, by determining a target modulation mode for the SRS sent on the target cell, where there exists a preset corresponding relationship between the target modulation method and the Scell.

Specifically, when obtaining the beam failure recovery message of the Secondary Cell (Scell) sent by the terminal to the base station through the target cell through the reference signal carried in the SRS on the target cell, the association information between SRS and BFR-RS may be configured through the base station, and different SRS can correspond to different BFR-RS. In this way, when the base station receives an SRS and the SRS has an associated BFR-RS, the base station can determine that a beam failure occurs on the SCell corresponding to the BFR-RS, and can determine that the candidate beam of the Scell reported by the UE is the beam corresponding to this BFR-RS. Optionally, the association information between the SRS and the BFR-RS is that one SRS corresponds to a group of BFR-RS, and the base station can determine a group of BFR-RS according to the SRS. Optionally, the relationship between each BFR-RS and SRS is a one-to-one corresponding relationship, and the base station can uniquely determine the BFR-RS according to the SRS.

When obtaining the beam failure recovery message of the Secondary Cell (Scell) sent by the terminal to the base station by determining the target scrambling sequence used when the SRS sent on the target cell is scrambled, the base station can configure the corresponding relationship between the scrambling sequence and the Scell, that is, the scrambling sequence can be determined according to each Scell, and different Scells can correspond to different scrambling sequences. In this way, the terminal sends the beam failure recovery message of the Scell to the base station through the target cell, and the SRS can be scrambled according to the target scrambling sequence associated with the Scell. In this way, when the base station receives the SRS, the base station can determine the SCell where the beam failure occurs, according to the superior code. Optionally, the association information between the Scell and the scrambling sequence is that one scrambling sequence corresponds to a group of Scells, and the base station can determine that the beam failure occurs on a group of Scells according to the scrambling sequence. Optionally, each Scell corresponds to a unique and specific scrambling sequence, and the base station can uniquely determine the Scell according to the scrambling sequence.

When obtaining the beam failure recovery message of the Secondary Cell (Scell) sent by the terminal to the base station by determining the target modulation mode of the SRS sent on the target cell, the corresponding relationship between the modulation mode and Scell can be configured through the base station, and different Scells correspond to different modulation methods. In this manner, the terminal sends the beam failure recovery message of the Scell to the base station through the target cell, and the SRS can be modulated according to the target modulation mode corresponding to the Scell. In this way, when the base station receives an SRS, according to the modulation mode of the SRS, the Scell where the beam failure occurs can be determined. Optionally, the association information between the Scell and the modulation mode is that one modulation mode corresponds to a group of Scells, and the base station can determine that the beam failure occurs on a group of Scells according to the modulation mode. Optionally, each Scell corresponds to a unique and specific modulation mode, and the base station can uniquely determine the Scell according to the modulation mode.

Optionally, the beam failure recovery message includes candidate beam indication information. When the SRS is scrambled using the target scrambling sequence on the target cell, and the beam failure recovery message of the Scell is sent to the base station, the base station can also configure the corresponding relationship between the scrambling sequence and the candidate beams indicated in the beam failure recovery message, and the candidate beams indicated by different beam failure recovery messages may correspond to different scrambling sequences. In this manner, the terminal sends the beam failure recovery message of the Scell to the base station through the target cell, and can scramble the SRS according to the target scrambling sequence associated with the candidate beam indicated by the beam failure recovery message. In this way, when the base station receives the SRS, it can determine the candidate beam indicated by the beam failure recovery message according to the optimal code. In this manner, optionally, the base station and the terminal need to exchange the corresponding relationship between the SRS and the Scell, so that the base station and the terminal may have the same consensus about which SRS is used to carry the beam failure recovery message of which Scell. The correspondence between this SRS and the Scell may be indicated to the terminal by the base station through a signaling When the SRS is modulated by the target modulation method on the target cell, and the base station sends the beam failure recovery message of the Scell, the corresponding relationship between the modulation method and the Scell can also be configured by the base station, and the candidate beams indicated by different beam failure recovery messages correspond to different modulation modes. In this way, the terminal sends the Scell beam failure recovery message to the base station through the target cell, and can modulate the SRS according to the target modulation mode corresponding to the candidate beam indicated by the beam failure recovery message. In this way, when the base station receives an SRS, according to the modulation mode of the SRS, the candidate beam indicated by the beam failure recovery message can be determined. In this manner, optionally, the base station and the terminal need to exchange the corresponding relationship between the SRS and the Scell, so that the base station and the terminal may have the same consensus about which SRS is used to carry the beam failure recovery message of which Scell. The correspondence between this SRS and the Scell may be indicated to the terminal by the base station through a signaling.

Optionally, in the foregoing manner, the preset association relationship between the reference signal and the SRS, the preset corresponding relationship between the target scrambling sequence and the Scell, and the preset corresponding relationship between the target modulation method and the Scells are configured for the terminal through the base station.

Optionally, in Step S310, in the obtaining the beam failure recovery message of the Scell sent by the terminal to the base station through the target cell, in a case that it is detected that a beam failure occurs on at least two Scells, the beam failure recovery message, which is sent to the base station by the terminal through the target cell and configured to indicate the beam failure of each Scell, is obtained; or the beam failure recovery message, which is sent to the base station by the terminal through the target cell and configured to indicate the beam failure of a part of Scells in at least two Scells, is obtained, and the beam failure recovery message configured to indicate the beam failure of another part of Scells in at least two Scells, is obtained.

Optionally, in Step S310, in the obtaining the beam failure recovery message of the Scell sent by the terminal to the base station through the target cell, the beam failure recovery message includes L bits of indication information, and each of the L bits is configured to indicate a beam failure reporting situation of the Scell, and L is an integer greater than or equal to 1.

Specifically, the L-bit indication information may use a bitmap to indicate the Scell that performs beam failure reporting. Optionally, the L-bit indication information can be configured to indicate that the corresponding Scell has a beam failure when the position corresponding to a bit is 1, and configured to indicate the corresponding Scell when the position corresponding to a bit is 0. No beam failure occurs; or, by indicating that the position corresponding to a bit is 0, it is configured to indicate that the corresponding Scell has a beam failure, and when the position corresponding to a bit is 1, it is configured to indicate that the corresponding Scell does not have a beam failure.

Optionally, in the embodiment of the present disclosure, the value of L is equal to the maximum number of Scells for beam failure reporting.

Optionally, L-bit indication information may be configured to indicate whether the Scell needs to perform a beam failure recovery.

Optionally, in the embodiments of the present disclosure, the L-bit indication information may also be configured to indicate candidate beams used for Scell beam failure. The corresponding relationship between the L-bit indication information and the candidate beam of the Scell may be indicated by the base station in advance by the base station through a signaling.

Optionally, the method of reporting beam failure described in the embodiment of the present disclosure is adopted, and the method further includes:

sending, to the terminal, an indication signaling configured to indicate the target cell corresponding to the Scell.

Specifically, the base station may indicate to the terminal in advance the target cell corresponding to the Scell through indication signaling. The signaling may be RRC signaling, MAC CE signaling and/or DCI signaling.

For example, the BFR signaling sent by the base station to the UE includes the indication information of the target cell. For example, a field is added to PRACH-Resource Dedicated FR, which is configured to indicate the target cell configured to transmit the beam failure report of the SCell. For another example, the base station configures a PRACH-Resource DedicatedBFR for each cell of the UE. Two fields are added to the PRACH-ResourceDedicatedBFR, one field is configured to indicate the identity of the SCell, and one field is configured to indicate the target of sending the beam failure recovery message of the Scell. The identity of the cell. For another example, two fields are added to the RRC signaling BeamFailureRecoveryConfig sent by the base station to the UE. One field is configured to indicate the identity of the SCell (field 1), and one field is configured to indicate the identity of the target cell that sends the beam failure recovery message of the Scell (Field 2), the two fields have a one-to-one correspondence. That is, the nth target cell indicated by field 2 is the target cell corresponding to the nth Scell indicated by field 1, where n is greater than or equal to 1, and less than or equal to the number of Scells indicated by field 1.

Optionally, in step S310, in the obtaining the beam failure recovery message of the Scell sent by the terminal to the base station through the target cell, the target cell is determined according to an agreement; or
in a case that the beam failure recovery message includes a candidate beam, the target cell is a cell corresponding to the candidate beam included in the beam failure recovery message, and there exists a preset association relationship between the candidate beam for the beam failure recovery of the Scell and the target cell; or
the target cell is determined according to the cell where the target reference signal is located, where the target reference signal is a reference signal that represents at least one candidate beam for a beam failure recovery of the Scell.

Optionally, a content agreed in the agreement includes at least one of:

the target cell corresponding to each Scell is a primary cell;
the target cell corresponding to each Scell is a cell of which a frequency point is within a predefined frequency domain range;
the target cell corresponding to each Scell in a frequency band is a same cell, and the target cell is predefined; and
the content agreed in the agreement is determined according to an indication of the base station.

For each specific method for determining the target cell described above, reference may be made to the description on the terminal side of the method of reporting beam failure in the embodiment of the present disclosure, which is not described in detail here.

An embodiment of the present disclosure also provides a terminal. As shown in FIG. 4, the terminal includes: a processor 401; and a memory 403 connected to the processor 401 through a bus interface 402, and the memory 403 is configured to store the For the programs and data used by the processor 401 when performing operations, the transceiver 404 is connected to the bus interface 402 for receiving and sending data under the control of the processor 401.

The processor 401 calls and executes the programs and data stored in the memory 403 to:

in a case that a beam failure of a Secondary Cell (Scell) is detected, send, through a target cell, a beam failure recovery message of the Scell to a base station.

Optionally, the target cell is different from the Scell.

Optionally, the processor 401 is configured to send through the target cell the beam failure recovery message of the Scell to the base station through at least one of:

sending the beam failure recovery message of the Scell to the base station, through a target Physical Random Access Channel (PRACH) of the target cell;
sending the beam failure recovery message of the Scell to the base station, through a Physical Uplink Control Channel (PUCCH) of the target cell;
sending the beam failure recovery message of the Scell to the base station, through a configured grant based Physical Uplink Shared Channel (PUSCH) on the target cell; and
sending the beam failure recovery message of the Scell to the base station, through an uplink Sounding Reference Signal (SRS) on the target cell.

Optionally, when the processor 401 sends the beam failure recovery message of the Scell to the base station through the target PRACH of the target cell, there exists a corresponding relationship between a target PRACH and a target reference signal, the target reference signal is configured to represent at least part of reporting information included in the beam failure recovery message of the Scell.

Optionally, when the processor 401 sends the beam failure recovery message of the Scell to the base station through the target PRACH of the target cell, the processor 401 sends the beam failure recovery message of the Scell to the base station through a preamble sequence or transmission time-frequency position of the target PRACH.

Optionally, the processor 401 is further configured to:

obtain at least one reference signal and an association relationship between each of the at least one reference signal and a corresponding PRACH which are configured by the base station;
the at least one reference signal is configured to represent a candidate beam for a beam failure recovery of the Scell, the target reference signal is one of the at least one reference signal, and the target PRACH is one of the PRACHs.

Optionally, when there are at least two reference signals configured by the base station, the sending the beam failure recovery message of the Scell to the base station through the target Physical Random Access Channel (PRACH) of the target cell includes:

selecting at least one reference signal as the target reference signal;
determining the target PRACH corresponding to each target reference signal according to the association relationship between each of the reference signals and the corresponding PRACH;
sending each of the target PRACHs to the base station Optionally, in a case that the processor 401 sends the beam failure recovery message of the Scell to the base station through the PUCCH of the target cell, the processor 401 sends the beam failure recovery message of the Scell to the base station, through PUCCH resource on the target cell configured by the base station for the terminal to send the beam failure recovery message of the Scell.

Optionally, when the processor 401 sends the beam failure recovery message of the Scell to the base station through the Physical Uplink Control Channel (PUCCH) of the target cell, the beam failure recovery message includes candidate beam indication information configured to indicate the candidate beam for beam failure recovery of the Scell.

Optionally, the candidate beam indication information indicates the candidate beam by indicating a reference signal corresponding to the candidate beam on the Scell.

Optionally, in a case that the processor 401 sends the beam failure recovery message of the Scell to the base station through the configured grant based PUSCH on the target cell, the processor 401 sends the beam failure recovery message of the Scell to the base station, through a Media Access Control Element (MAC CE) carried in the configured grant based PUSCH on the target cell; or the processor 401 sends the beam failure recovery message of the Scell to the base station, through Semi-persistent Channel State Information (SP CSI) carried in the configured grant based PUSCH on the target cell.

Optionally, the processor 401 sending the beam failure recovery message of the Scell to the base station through the uplink SRS on the target cell includes at least one of:

a preset association relationship between the SRS on the target cell and a reference signal of a candidate beam configured to represent a beam failure recovery of the Scell; or scrambling the SRS by using a target scrambling sequence on the target cell, where there exists a preset corresponding relationship between the target scrambling sequence and the Scell; or modulating the SRS by a target modulation method on the target cell, where there exists a preset corresponding relationship between the target modulation method and the Scell.

Optionally, in a case that it is detected that a beam failure occurs on at least two Scells, the processor 401 sending, through the target cell, the beam failure recovery message of the Scell to the base station further includes: sending, to the base station, through the target cell, the beam failure recovery message configured to indicate the beam failure of each Scell; or sending, to the base station, through the target cell, the beam failure recovery message configured to indicate the beam failure of a part of Scells in at least two Scells, and the beam failure recovery message configured to indicate the beam failure of another part of Scells in at least two Scells.

Optionally, in the processor 401 sending the beam failure recovery message of the Scell to the base station through the target cell, the beam failure recovery message includes L bits of indication information, and each of the L bits is configured to indicate a beam failure reporting situation of the Scell, and L is an integer greater than or equal to 1.

Optionally, the processor 401 is further configured to:

determine the target cell corresponding to the Scell according to an agreement; or in a case that the beam failure recovery message includes a candidate beam, based on a preset association relationship between a candidate beam for a beam failure recovery of the Scell and at least one cell, determining a cell corresponding to a candidate beam included in the beam failure recovery message as the target cell; or determining the target cell according to a cell where the target reference signal is located, where the target reference signal is a reference signal that represents at least one candidate beam for a beam failure recovery of the Scell.

Optionally, a content agreed in the agreement includes at least one of:

the target cell corresponding to each Scell is a primary cell;

the target cell corresponding to each Scell is a cell of which a frequency point is within a predefined frequency domain range;

the target cell corresponding to each Scell in a frequency band is a same cell, and the target cell is predefined; and the content agreed in the agreement is determined according to an indication of the base station.

Optionally, in the case that the beam failure recovery message includes the candidate beam, in the determining the target cell according to the cell where the target reference signal is located, the target reference signal is configured to represent the candidate beam included in the beam failure recovery message.

It should be noted that in FIG. 4, the bus architecture may include any number of interconnected buses and bridges. Specifically, one or more processors represented by the processor 401 and various circuits of the memory represented by the memory 403 are linked together. The bus architecture can also link various other circuits such as peripheral devices, voltage regulators, power management circuits, etc., which are all known in the art, and therefore, no further description will be given herein. The bus interface provides the interface. The transceiver 404 may be a plurality of elements, including a transmitter and a transceiver, and provide a unit for communicating with various other devices on the transmission medium. For different terminals, the user interface 405 may also be an interface capable of externally connecting internally required equipment, and the connected equipment includes but not limited to a keypad, a display, a speaker, a microphone, a joystick, and the like. The processor 401 is responsible for managing the bus architecture and general processing, and the memory 403 can store data used by the processor 401 when performing operations.

Those skilled in the art can understand that all or part of the steps in the foregoing embodiments can be implemented by hardware, or by a computer program that instructs related hardware. The computer program includes instructions for performing part or all of the steps of the foregoing method, and the computer program can be stored in a readable storage medium, which can be any form of storage medium.

Figure 5:
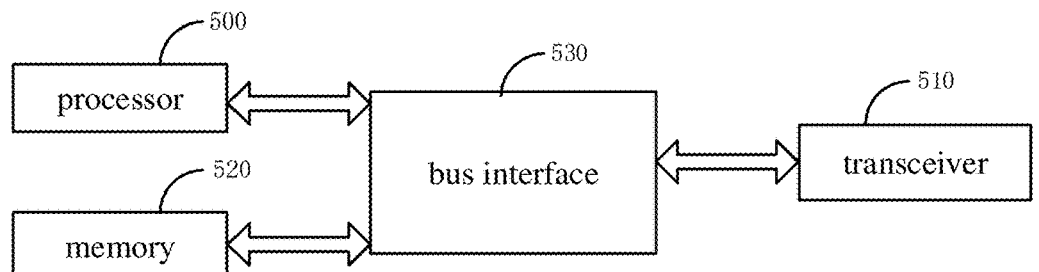
FIG. 5 is a schematic structural diagram of a base station according to an embodiment of the disclosure.

The embodiment of the present disclosure also provides a base station. As shown in FIG. 5, the base station includes:

a processor 500; a memory 520 connected to the processor 500 through a bus interface 530, and a transceiver 510 connected to the processor 500 through a bus interface; the memory 520 is configured to store the operation of the processor The program and data used; the processor 500 is configured to run the computer program to send data information or pilots or receive uplink control channels, the transceiver 510 is configured to send under the control of the processor 500 Data information or pilot, and receiving the uplink control channel; when the processor 500 calls and executes the programs and data stored in the memory 520, the following functional modules are implemented: the processor 500 is configured to read the programs in the memory 520 to:

obtain a beam failure recovery message of a Secondary Cell (Scell) which is sent by a terminal to the base station through a target cell.

Optionally, the target cell is different from the Scell.

Optionally, the processor 500 uses at least one of the following methods to obtain the beam failure recovery message of the Secondary Cell (Scell) sent by the terminal to the base station through the target cell:

obtaining the beam failure recovery message of the Scell sent to the base station by the terminal, through a target Physical Random Access Channel (PRACH) of the target cell;

obtaining the beam failure recovery message of the Scell sent to the base station by the terminal, through a Physical Uplink Control Channel (PUCCH) of the target cell;

obtaining the beam failure recovery message of the Scell sent to the base station by the terminal, through a configured grant based Physical Uplink Shared Channel (PUSCH) on the target cell; and obtaining the beam failure recovery message of the Scell sent to the base station by the terminal, through an uplink Sounding Reference Signal (SRS) on the target cell.

Optionally, when the processor 500 obtains the beam failure recovery message of the Scell sent to the base station by the terminal through the PRACH of the target cell, a candidate beam reported by the terminal is determined according to the PRACH, where there exists a corresponding relationship between a target PRACH and a target reference signal, the target reference signal is configured to represent at least part of reporting information included in the beam failure recovery message of the Scell.

Optionally, when the processor 500 obtains the beam failure recovery message of the Secondary Cell (Scell) sent by the terminal to the base station through the target Physical Random Access Channel (PRACH) of the target cell, the processor 500 uses the preamble sequence or the transmission time-frequency position of the target Physical Random Access Channel (PRACH) to obtain the beam failure recovery message.

Optionally, the processor 500 is further configured to:

send, to the terminal, at least one reference signal and an association relationship between each of the at least one reference signal and a corresponding PRACH which are configured;

where the at least one reference signal is configured to represent the candidate beam for a beam failure recovery of the Scell, the target reference signal is one of the at least one reference signal, and the target PRACH is one of the PRACHs.

Optionally, in a case that the processor 500 obtains the beam failure recovery message of the Scell sent to the base station by the terminal through the PUCCH of the target cell, the beam failure recovery message of the Scell sent by the terminal is obtained through PUCCH resource on the target cell configured by the base station for the terminal to send the beam failure recovery message of the Scell.

Optionally, when the processor 500 obtains the beam failure recovery message of the Secondary Cell (Scell) sent by the terminal to the base station through the Physical Uplink Control Channel (PUCCH) of the target cell, the beam failure recovery message includes a candidate beam indication information configured to indicate a candidate beam for a beam failure recovery of the Scell.

Optionally, the candidate beam indication information indicates the candidate beam by indicating a reference signal corresponding to the candidate beam on the Scell.

Optionally, when the processor 500 obtains the beam failure recovery message of the Secondary Cell (Scell) sent by the terminal to the base station through the Physical Uplink Shared Channel (PUSCH) permitted based on the configuration on the target cell:

the beam failure recovery message of the Scell sent to the base station by the terminal is obtained through a Media Access Control Element (MAC CE) carried in the configured grant based PUSCH on the target cell; or the beam failure recovery message of the Scell sent to the base station by the terminal is obtained through Semi-persistent Channel State Information (SP CSI) carried in the configured grant based PUSCH on the target cell.

Optionally, the processor 500 adopts at least one of the following methods to obtain the beam failure recovery message of the Secondary Cell (Scell) sent by the terminal to the base station through the uplink Sounding Reference Signal (SRS) on the target cell:

obtaining the beam failure recovery message of the Scell which is sent by the terminal to the base station through the target cell, through a reference signal carried in the SRS on the target cell, where the reference signal is configured to represent a candidate beam for a beam failure recovery of the S cell, and there exists a preset association relationship between the reference signal and the SRS; or obtaining the beam failure recovery message of the Scell which is sent by the terminal to the base station, by determining a target scrambling sequence for scrambling the SRS sent on the target cell, where there exists a preset corresponding relationship between the target scrambling sequence and the Scell; or obtaining the beam failure recovery message of the Scell which is sent by the terminal to the base station, by determining a target modulation mode for the SRS sent on the target cell, where there exists a preset corresponding relationship between the target modulation method and the Scell.

Optionally, the preset association relationship between the reference signal and the SRS, the preset corresponding relationship between the target scrambling sequence and the Scell, and the preset corresponding relationship between the target modulation method and the Scells are configured for the terminal through the base station.

Optionally, when the processor 500 acquires the beam failure recovery message of the Secondary Cell (Scell) sent by the terminal to the base station through the target cell, in a case that it is detected that a beam failure occurs on at least two Scells, the beam failure recovery message, which is sent to the base station by the terminal through the target cell and configured to indicate the beam failure of each Scell, is obtained; or the beam failure recovery message, which is sent to the base station by the terminal through the target cell and configured to indicate the beam failure of a part of Scells in at least two Scells, is obtained, and the beam failure recovery message configured to indicate the beam failure of another part of Scells in at least two Scells, is obtained.

Optionally, in the obtaining the beam failure recovery message of the Scell sent by the terminal to the base station through the target cell, the beam failure recovery message includes L bits of indication information, and each of the L bits is configured to indicate a beam failure reporting situation of the S cell, and L is an integer greater than or equal to 1.

Optionally, the processor 500 is further configured to:

send indication signaling configured to indicate the target cell corresponding to the Scell to the terminal.

Optionally, in the step of the processor 500 obtaining the beam failure recovery message of the Secondary Cell (Scell) sent by the terminal to the base station through the target cell:

the target cell is determined according to an agreement; or in a case that the beam failure recovery message includes a candidate beam, the target cell is a cell corresponding to the candidate beam included in the beam failure recovery message, and there exists a preset association relationship between the candidate beam for the beam failure recovery of the Scell and the target cell; or the target cell is determined according to the cell where the target reference signal is located, where the target reference signal is a reference signal that represents at least one candidate beam for a beam failure recovery of the Scell.

Optionally, a content agreed in the agreement includes at least one of:

the target cell corresponding to each Scell is a primary cell;

the target cell corresponding to each Scell is a cell of which a frequency point is within a predefined frequency domain range;

the target cell corresponding to each Scell in a frequency band is a same cell, and the target cell is predefined; and the content agreed in the agreement is determined according to an indication of the base station.

In addition, in FIG. 5, the bus architecture may include any number of interconnected buses and bridges. Specifically, one or more processors represented by the processor 500 and various circuits of the memory represented by the memory 520 are linked together. The bus architecture can also link various other circuits such as peripheral devices, voltage regulators, power management circuits, etc., which are all known in the art, and therefore, no further description will be given herein. The bus interface provides the interface. The transceiver 510 may be a plurality of elements, that is, including a transmitter and a transceiver, and provide a unit for communicating with various other devices on a transmission medium. The processor 500 is responsible for managing the bus architecture and general processing, and the memory 520 can store data used by the processor 500 when performing operations.

Figure 6:
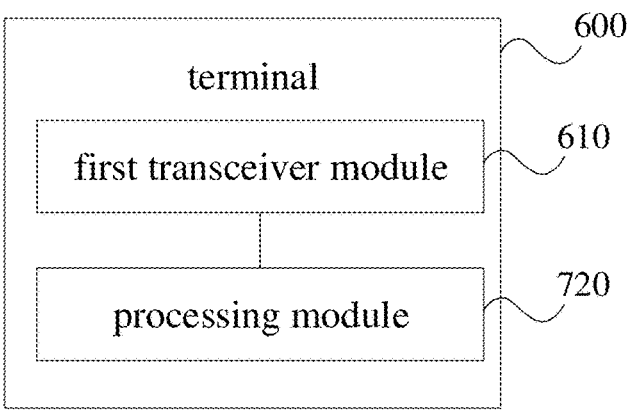
FIG. 6 is a schematic structural diagram of a terminal according to another embodiment of the disclosure.

The embodiment of the present disclosure also provides a terminal. As shown in FIG. 6, the terminal 600 includes:

a first transceiver module 610, configured to, in a case that a beam failure of a Secondary Cell (Scell) is detected, send, through a target cell, a beam failure recovery message of the Scell to a base station.

Optionally, the target cell is different from the Scell.

Optionally, the first transceiver module 610 is configured to send through the target cell the beam failure recovery message of the Scell to the base station through at least one of:

sending the beam failure recovery message of the Scell to the base station, through a target Physical Random Access Channel (PRACH) of the target cell;

sending the beam failure recovery message of the Scell to the base station, through a Physical Uplink Control Channel (PUCCH) of the target cell;

sending the beam failure recovery message of the Scell to the base station, through a configured grant based Physical Uplink Shared Channel (PUSCH) on the target cell; and sending the beam failure recovery message of the Scell to the base station, through an uplink Sounding Reference Signal (SRS) on the target cell.

Optionally, when the first transceiver module 610 sends the beam failure recovery message of the Scell to the base station through the target PRACH of the target cell, there exists a corresponding relationship between a target PRACH and a target reference signal, the target reference signal is configured to represent at least part of reporting information included in the beam failure recovery message of the Scell.

Optionally, when the first transceiver module 610 sends the beam failure recovery message of the Scell to the base station through the target PRACH of the target cell, the first transceiver module 610 sends the beam failure recovery message of the Scell to the base station through a preamble sequence or transmission time-frequency position of the target PRACH.

Optionally, the first transceiver module 610 is further configured to:

obtain at least one reference signal and an association relationship between each of the at least one reference signal and a corresponding PRACH which are configured by the base station;

the at least one reference signal is configured to represent a candidate beam for a beam failure recovery of the Scell, the target reference signal is one of the at least one reference signal, and the target PRACH is one of the PRACHs.

Optionally, when there are at least two reference signals configured by the base station, the sending the beam failure recovery message of the Scell to the base station through the target Physical Random Access Channel (PRACH) of the target cell includes:

selecting at least one reference signal as the target reference signal;

determining the target PRACH corresponding to each target reference signal according to the association relationship between each of the reference signals and the corresponding PRACH;

sending each of the target PRACHs to the base station

Optionally, in a case that the first transceiver module 610 sends the beam failure recovery message of the Scell to the base station through the PUCCH of the target cell, the first transceiver module 610 sends the beam failure recovery message of the Scell to the base station, through PUCCH resource on the target cell configured by the base station for the terminal to send the beam failure recovery message of the Scell.

Optionally, when the first transceiver module 610 sends the beam failure recovery message of the Scell to the base station through the Physical Uplink Control Channel (PUCCH) of the target cell, the beam failure recovery message includes candidate beam indication information configured to indicate the candidate beam for beam failure recovery of the S cell.

Optionally, the candidate beam indication information indicates the candidate beam by indicating a reference signal corresponding to the candidate beam on the Scell.

Optionally, in a case that the first transceiver module 610 sends the beam failure recovery message of the Scell to the base station through the configured grant based PUSCH on the target cell, the first transceiver module 610 sends the beam failure recovery message of the Scell to the base station, through a Media Access Control Element (MAC CE) carried in the configured grant based PUSCH on the target cell; or the first transceiver module 610 sends the beam failure recovery message of the Scell to the base station, through Semi-persistent Channel State Information (SP CSI) carried in the configured grant based PUSCH on the target cell.

Optionally, the first transceiver module 610 sending the beam failure recovery message of the Scell to the base station through the uplink SRS on the target cell includes at least one of:

a preset association relationship between the SRS on the target cell and a reference signal of a candidate beam configured to represent a beam failure recovery of the Scell; or scrambling the SRS by using a target scrambling sequence on the target cell, where there exists a preset corresponding relationship between the target scrambling sequence and the Scell; or modulating the SRS by a target modulation method on the target cell, where there exists a preset corresponding relationship between the target modulation method and the Scell.

Optionally, in a case that it is detected that a beam failure occurs on at least two Scells, the first transceiver module 610 sending, through the target cell, the beam failure recovery message of the Scell to the base station further includes: sending, to the base station, through the target cell, the beam failure recovery message configured to indicate the beam failure of each Scell; or sending, to the base station, through the target cell, the beam failure recovery message configured to indicate the beam failure of a part of Scells in at least two Scells, and the beam failure recovery message configured to indicate the beam failure of another part of Scells in at least two Scells.

Optionally, in the first transceiver module 610 sending the beam failure recovery message of the Scell to the base station through the target cell, the beam failure recovery message includes L bits of indication information, and each of the L bits is configured to indicate a beam failure reporting situation of the Scell, and L is an integer greater than or equal to 1.

Optionally, the first transceiver module 610 is further configured to:

determine the target cell corresponding to the Scell according to an agreement; or in a case that the beam failure recovery message includes a candidate beam, based on a preset association relationship between a candidate beam for a beam failure recovery of the Scell and at least one cell, determining a cell corresponding to a candidate beam included in the beam failure recovery message as the target cell; or determining the target cell according to a cell where the target reference signal is located, where the target reference signal is a reference signal that represents at least one candidate beam for a beam failure recovery of the Scell.

Optionally, a content agreed in the agreement includes at least one of:

the target cell corresponding to each Scell is a primary cell;

the target cell corresponding to each Scell is a cell of which a frequency point is within a predefined frequency domain range;

the target cell corresponding to each Scell in a frequency band is a same cell, and the target cell is predefined; and the content agreed in the agreement is determined according to an indication of the base station.

Optionally, in the case that the beam failure recovery message includes the candidate beam, in the determining the target cell according to the cell where the target reference signal is located, the target reference signal is configured to represent the candidate beam included in the beam failure recovery message.

Figure 7:
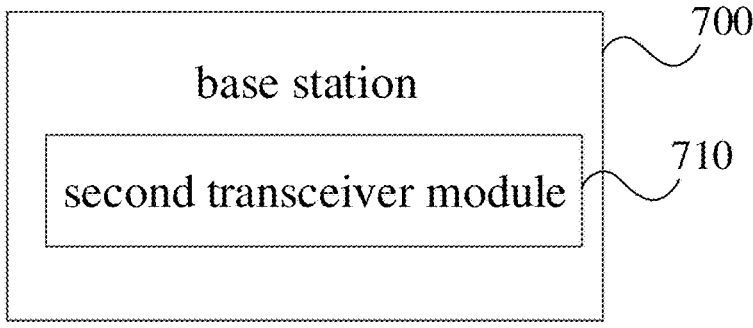
FIG. 7 is a schematic structural diagram of a base station according to another embodiment of the disclosure.

The embodiment of the present disclosure also provides a base station. As shown in FIG. 7, the base station includes:

a second transceiver module 710, configured to obtain a beam failure recovery message of a Secondary Cell (Scell) which is sent by a terminal to the base station through a target cell.

Optionally, the target cell is different from the Scell.

Optionally, the second transceiver module 710 uses at least one of the following methods to obtain the beam failure recovery message of the Secondary Cell (Scell) sent by the terminal to the base station through the target cell:

obtaining the beam failure recovery message of the Scell sent to the base station by the terminal, through a target Physical Random Access Channel (PRACH) of the target cell;

obtaining the beam failure recovery message of the Scell sent to the base station by the terminal, through a Physical Uplink Control Channel (PUCCH) of the target cell;

obtaining the beam failure recovery message of the Scell sent to the base station by the terminal, through a configured grant based Physical Uplink Shared Channel (PUSCH) on the target cell; and obtaining the beam failure recovery message of the Scell sent to the base station by the terminal, through an uplink Sounding Reference Signal (SRS) on the target cell.

Optionally, when the second transceiver module 710 obtains the beam failure recovery message of the Scell sent to the base station by the terminal through the PRACH of the target cell, a candidate beam reported by the terminal is determined according to the PRACH, where there exists a corresponding relationship between a target PRACH and a target reference signal, the target reference signal is configured to represent at least part of reporting information included in the beam failure recovery message of the Scell.

Optionally, when the second transceiver module 710 obtains the beam failure recovery message of the Secondary Cell (Scell) sent by the terminal to the base station through the target Physical Random Access Channel (PRACH) of the target cell, the processor 500 uses the preamble sequence or the transmission time-frequency position of the target Physical Random Access Channel (PRACH) to obtain the beam failure recovery message.

Optionally, the second transceiver module 710 is further configured to:

send, to the terminal, at least one reference signal and an association relationship between each of the at least one reference signal and a corresponding PRACH which are configured;

where the at least one reference signal is configured to represent the candidate beam for a beam failure recovery of the Scell, the target reference signal is one of the at least one reference signal, and the target PRACH is one of the PRACHs.

Optionally, in a case that the second transceiver module 710 obtains the beam failure recovery message of the Scell sent to the base station by the terminal through the PUCCH of the target cell, the beam failure recovery message of the Scell sent by the terminal is obtained through PUCCH resource on the target cell configured by the base station for the terminal to send the beam failure recovery message of the Scell.

Optionally, when the second transceiver module 710 obtains the beam failure recovery message of the Secondary Cell (Scell) sent by the terminal to the base station through the Physical Uplink Control Channel (PUCCH) of the target cell, the beam failure recovery message includes a candidate beam indication information configured to indicate a candidate beam for a beam failure recovery of the Scell.

Optionally, the candidate beam indication information indicates the candidate beam by indicating a reference signal corresponding to the candidate beam on the Scell.

Optionally, when the second transceiver module 710 obtains the beam failure recovery message of the Secondary Cell (Scell) sent by the terminal to the base station through the Physical Uplink Shared Channel (PUSCH) permitted based on the configuration on the target cell:

the beam failure recovery message of the Scell sent to the base station by the terminal is obtained through a Media Access Control Element (MAC CE) carried in the configured grant based PUSCH on the target cell; or the beam failure recovery message of the Scell sent to the base station by the terminal is obtained through Semi-persistent Channel State Information (SP CSI) carried in the configured grant based PUSCH on the target cell.

Optionally, the second transceiver module 710 adopts at least one of the following methods to obtain the beam failure recovery message of the Secondary Cell (Scell) sent by the terminal to the base station through the uplink Sounding Reference Signal (SRS) on the target cell:

obtaining the beam failure recovery message of the Scell which is sent by the terminal to the base station through the target cell, through a reference signal carried in the SRS on the target cell, where the reference signal is configured to represent a candidate beam for a beam failure recovery of the S cell, and there exists a preset association relationship between the reference signal and the SRS; or obtaining the beam failure recovery message of the Scell which is sent by the terminal to the base station, by determining a target scrambling sequence for scrambling the SRS sent on the target cell, where there exists a preset corresponding relationship between the target scrambling sequence and the Scell; or obtaining the beam failure recovery message of the Scell which is sent by the terminal to the base station, by determining a target modulation mode for the SRS sent on the target cell, where there exists a preset corresponding relationship between the target modulation method and the Scell.

Optionally, the preset association relationship between the reference signal and the SRS, the preset corresponding relationship between the target scrambling sequence and the Scell, and the preset corresponding relationship between the target modulation method and the Scells are configured for the terminal through the base station.

Optionally, when the second transceiver module 710 acquires the beam failure recovery message of the Secondary Cell (Scell) sent by the terminal to the base station through the target cell, in a case that it is detected that a beam failure occurs on at least two Scells, the beam failure recovery message, which is sent to the base station by the terminal through the target cell and configured to indicate the beam failure of each Scell, is obtained; or the beam failure recovery message, which is sent to the base station by the terminal through the target cell and configured to indicate the beam failure of a part of Scells in at least two Scells, is obtained, and the beam failure recovery message configured to indicate the beam failure of another part of Scells in at least two Scells, is obtained.

Optionally, in the obtaining the beam failure recovery message of the Scell sent by the terminal to the base station through the target cell, the beam failure recovery message includes L bits of indication information, and each of the L bits is configured to indicate a beam failure reporting situation of the S cell, and L is an integer greater than or equal to 1.

Optionally, the second transceiver module 710 is further configured to:

send indication signaling configured to indicate the target cell corresponding to the Scell to the terminal.

Optionally, in the step of the second transceiver module 710 obtaining the beam failure recovery message of the Secondary Cell (Scell) sent by the terminal to the base station through the target cell:

the target cell is determined according to an agreement; or in a case that the beam failure recovery message includes a candidate beam, the target cell is a cell corresponding to the candidate beam included in the beam failure recovery message, and there exists a preset association relationship between the candidate beam for the beam failure recovery of the Scell and the target cell; or the target cell is determined according to the cell where the target reference signal is located, where the target reference signal is a reference signal that represents at least one candidate beam for a beam failure recovery of the Scell.

Optionally, a content agreed in the agreement includes at least one of:

the target cell corresponding to each Scell is a primary cell;

the target cell corresponding to each Scell is a cell of which a frequency point is within a predefined frequency domain range;

the target cell corresponding to each Scell in a frequency band is a same cell, and the target cell is predefined; and the content agreed in the agreement is determined according to an indication of the base station.

In another aspect, the specific embodiments of the present disclosure also provide a computer-readable storage medium, wherein a computer program is stored in the computer-readable storage medium, the computer program is executed by a processor to perform the method of reporting beam failure hereinabove.

Based on the above description, those skilled in the art should be able to understand the specific structure of the computer-readable storage medium that executes the method of reporting beam failure of the present disclosure, which will not be described in detail here.

In addition, it should be pointed out that in the device and method of the present disclosure, obviously, each component or each step can be decomposed and/or recombined. These decomposition and/or recombination should be regarded as equivalent solutions of the present disclosure. In addition, the steps of performing the above series of processing can naturally be performed in a chronological order according to the order of description, but it is not necessarily performed in a chronological order, and some steps can be performed in parallel or independently of each other. Those of ordinary skill in the art can understand that all or any of the steps or components of the method and device of the present disclosure can be used in any computing device (including a processor, storage medium, etc.) or a network of computing devices, using hardware and firmware. Software, or a combination of them. This can be achieved by those of ordinary skill in the art using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be achieved only by providing a program product containing program code for implementing the method or device. That is, such a program product also constitutes the present disclosure, and a storage medium storing such a program product also constitutes the present disclosure. Obviously, the storage medium may be any well-known storage medium or any storage medium developed in the future. It should also be pointed out that in the device and method of the present disclosure, obviously, each component or each step can be decomposed and/or recombined. These decomposition and/or recombination should be regarded as equivalent solutions of the present disclosure. In addition, the steps of performing the above-mentioned series of processing can naturally be performed in chronological order in the order of description, but it is not necessarily performed in chronological order. Some steps can be performed in parallel or independently of each other.

It can be understood that the embodiments described in the embodiments of the present disclosure may be implemented by hardware, software, firmware, middleware, microcode, or a combination thereof. For hardware implementation, the processing unit can be implemented in one or more application specific integrated circuits (ASIC), digital signal processor (Digital Signal Processing, DSP), digital signal processing equipment (DSP Device, DSPD), programmable Logic device (Programmable Logic Device, PLD), Field-Programmable Gate Array (Field-Programmable Gate Array, FPGA), general-purpose processors, controllers, microcontrollers, microprocessors, and others for performing the functions described in this disclosure Electronic unit or its combination.

For software implementation, the technology described in the embodiments of the present disclosure can be implemented through modules (for example, procedures, functions, etc.) that perform the functions described in the embodiments of the present disclosure. The software codes can be stored in the memory and executed by the processor. The memory can be implemented in the processor or external to the processor.

The above are some embodiments of the present disclosure. It should be pointed out that for those of ordinary skill in the art, without departing from the principles described in the present disclosure, several improvements and modifications can be made, and these improvements and modifications are also It should be regarded as the protection scope of this disclosure.

What is claimed is:

1. A method of reporting beam failure, applied to a terminal and comprising:

in response to detecting a beam failure of a Secondary Cell (Scell), determining a cell where a target reference signal is located as a target cell corresponding to the Scell, wherein the target reference signal is a reference signal that represents at least one candidate beam for a beam failure recovery of the Scell;

sending, through the target cell, a beam failure recovery message of the Scell to a base station;

wherein the beam failure recovery message comprises L bits of bitmap indication information, and each of the L bits of the bitmap indication information is configured to indicate a beam failure reporting situation of a corresponding one of a plurality of Scells, and Lis an integer greater than 1;

wherein the Scell corresponds to a plurality of reference signals for the beam failure recovery of the Scell, each of which corresponds to a corresponding one of a plurality of candidate beams, the determining a cell where a target reference signal is located as a target cell corresponding to the Scell comprises:

selecting, from the plurality of candidate beams, a candidate beam to be reported in the beam failure recovery message;

determining, from the plurality of reference signals, a reference signal corresponding to the selected candidate beam as the target reference signal; and determining a cell where the reference signal corresponding to the selected candidate beam is located as the target cell.

2. The method of reporting beam failure according to claim 1, wherein the target cell is different from the Scell.

3. The method of reporting beam failure according to claim 1, wherein the sending through the target cell the beam failure recovery message of the Scell to the base station comprises at least one of:

sending the beam failure recovery message of the Scell to the base station, through a Physical Uplink Control Channel (PUCCH) of the target cell; or sending the beam failure recovery message of the Scell to the base station, through a configured grant based Physical Uplink Shared Channel (PUSCH) on the target cell.

4. The method of reporting beam failure according to claim 3, wherein the sending the beam failure recovery message of the Scell to the base station through the PUCCH of the target cell comprises:

sending the beam failure recovery message of the Scell to the base station, through PUCCH resource on the target cell configured by the base station for the terminal to send the beam failure recovery message of the Scell.

5. The method of reporting beam failure according to claim 3, wherein the sending the beam failure recovery message of the Scell to the base station, through a configured grant based Physical Uplink Shared Channel (PUSCH) on the target cell comprises:

sending the beam failure recovery message of the Scell to the base station, through a Media Access Control Element (MAC CE) carried in the configured grant based PUSCH on the target cell.

6. The method of reporting beam failure according to claim 1, further comprising: in response to detecting that a beam failure occurs on at least two Scells, the sending, through the target cell, the beam failure recovery message of the Scell to the base station further comprises:

sending, to the base station, through the target cell, the beam failure recovery message configured to indicate the beam failure of each Scell; or sending, to the base station, through the target cell, the beam failure recovery message configured to indicate the beam failure of a part of Scells in at least two Scells, and the beam failure recovery message configured to indicate the beam failure of another part of Scells in at least two Scells.

7. The method of reporting beam failure according to claim 1, wherein the target reference signal represents the at least one candidate beam to be reported in the beam failure recovery message.

8. The method according to claim 1, wherein the target cell comprises an uplink configuration for uplink transmission and a downlink configuration for downlink transmission.

9. A method of reporting beam failure, applied to a base station and comprising:

obtaining a beam failure recovery message of a Secondary Cell (Scell) which is sent by a terminal to the base station through a target cell;

wherein the Scell corresponds to a plurality of reference signals for a beam failure recovery of the Scell, each of which corresponds to a corresponding one of a plurality of candidate beams for the beam failure recovery of the Scell;

wherein the target cell is a cell where a target reference signal is located, wherein the target reference signal is a reference signal corresponding to a candidate beam to be reported in the beam failure recovery message which is selected by the terminal from the plurality of candidate beams, and the target reference signal is a reference signal that represents the selected candidate beam for the beam failure recovery of the Scell;

wherein the beam failure recovery message comprises L bits of bitmap indication information, and each of the Z bits of the bitmap indication information is configured to indicate a beam failure reporting situation of a corresponding one of a plurality of Scells, and L is an integer greater than 1.

10. The method of reporting beam failure according to claim 9, wherein the target cell is different from the Scell.

11. The method of reporting beam failure according to claim 9, wherein the obtaining the beam failure recovery message of the Scell sent by the terminal to the base station through the target cell comprises at least one of:

obtaining the beam failure recovery message of the Scell sent to the base station by the terminal, through a Physical Uplink Control Channel (PUCCH) of the target cell; or obtaining the beam failure recovery message of the Scell sent to the base station by the terminal, through a configured grant based Physical Uplink Shared Channel (PUSCH) on the target cell.

12. The method of reporting beam failure according to claim 11, wherein the obtaining the beam failure recovery message of the Scell sent to the base station by the terminal through the PUCCH of the target cell comprises:

obtaining the beam failure recovery message of the Scell sent by the terminal through PUCCH resource on the target cell configured by the base station for the terminal to send the beam failure recovery message of the Scell; and the obtaining the beam failure recovery message of the Scell sent to the base station by the terminal, through a configured grant based PUSCH on the target cell comprises:

the beam failure recovery message of the Scell sent to the base station by the terminal is obtained through a Media Access Control Element (MAC CE) carried in the configured grant based PUSCH on the target cell.

13. The method of reporting beam failure according to claim 9, wherein the obtaining the beam failure recovery message of the Scell which is sent by the terminal to the base station through the target cell comprises:

obtaining the beam failure recovery message which is sent to the base station by the terminal through the target cell and configured to indicate the beam failure of the Scell; or obtaining the beam failure recovery message, which is sent to the base station by the terminal through the target cell and configured to indicate the beam failure of a part of Scells in at least two Scells, and obtaining the beam failure recovery message configured to indicate the beam failure of another part of Scells in at least two Scells.

14. The method of reporting beam failure according to claim 9, further comprising:

sending, to the terminal, an indication signaling configured to indicate the target cell corresponding to the Scell.

15. The method of reporting beam failure according to claim 9, wherein the target reference signal represents the at least one candidate beam to be reported in the beam failure recovery message.

16. A terminal, comprising: a transceiver, a memory, a processor and a program stored in the memory, wherein the processor is configured to execute the program to:

in response to detecting a beam failure of a Secondary Cell (Scell), determine a cell where a target reference signal is located as a target cell corresponding to the Scell, wherein the target reference signal is a reference signal that represents at least one candidate beam for a beam failure recovery of the Scell;

send, through the target cell, a beam failure recovery message of the Scell to a base station;

wherein the beam failure recovery message comprises L bits of bitmap indication information, and each of the L bits of the bitmap indication information is configured to indicate a beam failure reporting situation of a corresponding one of a plurality of Scells, and L is an integer greater than 1;

wherein the Scell corresponds to a plurality of reference signals for the beam failure recovery of the Scell, each of which corresponds to a corresponding one of a plurality of candidate beams, wherein the processor is further configured to execute the program to:

select, from the plurality of candidate beams, a candidate beam to be reported in the beam failure recovery message;

determine, from the plurality of reference signals, a reference signal corresponding to the selected candidate beam as the target reference signal; and determine a cell where the reference signal corresponding to the selected candidate beam is located as the target cell.

17. The terminal according to claim 16, wherein the processor is further configured to:

send the beam failure recovery message of the Scell to the base station, through a Physical Uplink Control Channel (PUCCH) of the target cell; or send the beam failure recovery message of the Scell to the base station, through a configured grant based Physical Uplink Shared Channel (PUSCH) on the target cell.

18. The terminal according to claim 17, wherein the processor is further configured to:

send the beam failure recovery message of the Scell to the base station, through a Media Access Control Element (MAC CE) carried in the configured grant based PUSCH on the target cell.

19. A base station, comprising: a transceiver, a memory, a processor and a program stored in the memory, wherein the processor is configured to execute the program to perform the method of reporting beam failure according to claim 9.

\* \* \* \* \*